United States Patent [19]

Mudd

[11] 3,773,426
[45] Nov. 20, 1973

[54] BACTERIAL GROWTH DETECTOR

[75] Inventor: Courtney Payne Mudd, Charlottesville, Va.

[73] Assignee: The United States of America as represented by the Secretary of the Department of Health, Education and Welfare, Washington, D.C.

[22] Filed: Feb. 22, 1972

[21] Appl. No.: 227,980

[52] U.S. Cl................. 356/205, 356/206, 356/201, 356/40, 356/246, 250/218
[51] Int. Cl. ......................................... G01n 21/22
[58] Field of Search ................ 356/40, 41, 42, 180, 356/201, 205, 206, 246; 250/218

[56] References Cited
UNITED STATES PATENTS 3,627,431  12/1971  Komarniski........................ 356/180
3,680,967   8/1972  Engelhardt.......................... 356/246
3,488,156   1/1970  Good et al. ...................... 356/180 X
3,533,744  10/1970  Unger.............................. 356/246 X Primary Examiner—David Schonberg
Assistant Examiner—Paul K. Godwin
Attorney—Alvin Browdy et al.

[57] ABSTRACT

A device for detecting bacterial growth in a plurality of dilutions. A test tray containing a plurality of test wells, each well having a different dilution, is inserted in a frame so that light passes through each well and onto a photo-transistor. If bacterial growth is present in the test well the light is attenuated, and the drop detected electronically, and punched on a card. A row of sensors comprising a phototransistor for each of eight dilutions simultaneously reads the samples, light being conducted to each sensor by means of optical fiber bundles.

8 Claims, 6 Drawing Figures

PATENTED NOV 20 1973

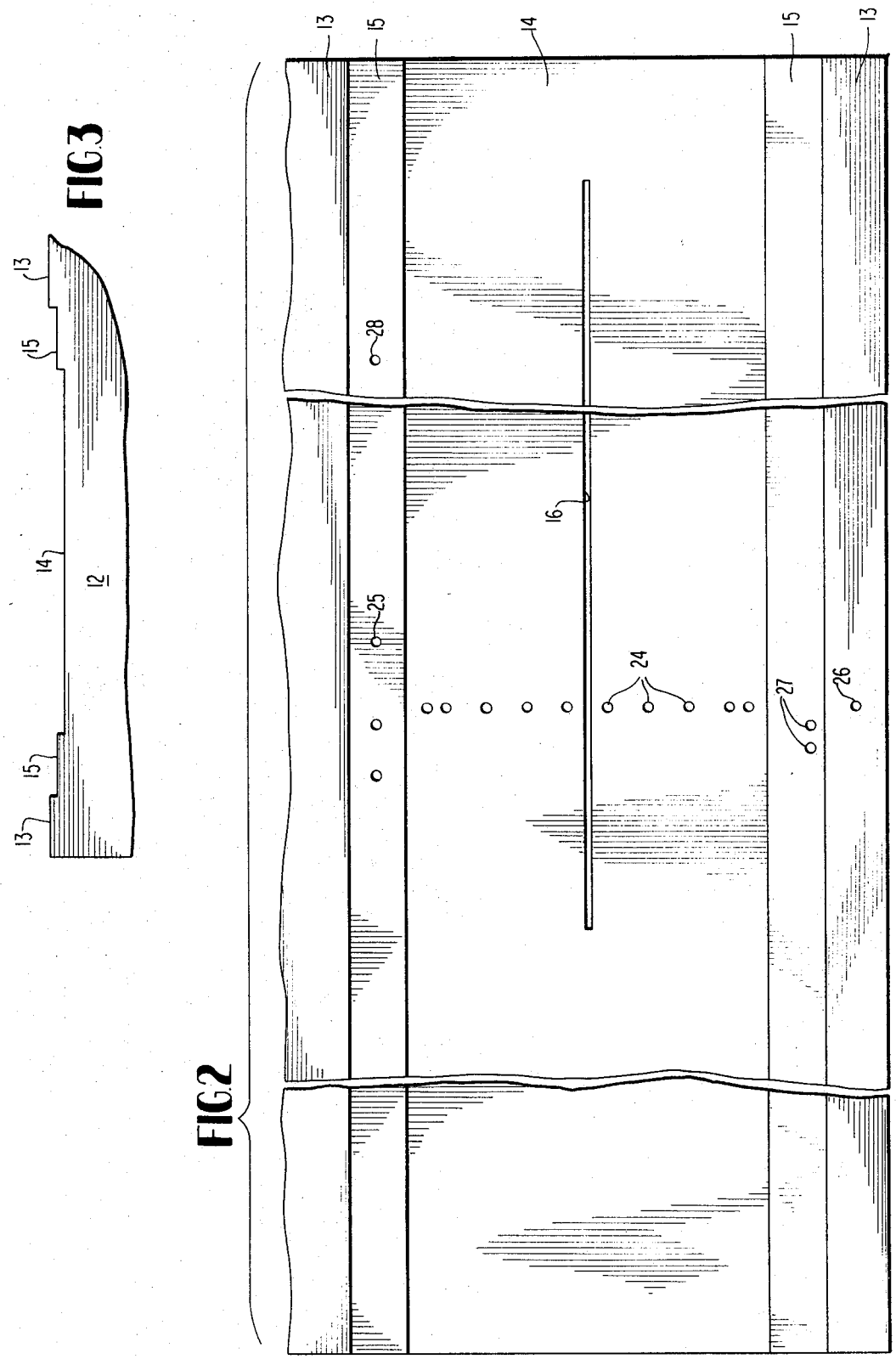

BACTERIAL GROWTH DETECTOR

The present invention relates to bacterial growth detectors, and more particularly to bacterial growth detectors which shine light through a plurality of dilutions, the light then impinging on a plurality of sensors which compare this light with a standard. When bacterial growth is present in the dilution, light passed through this dilution is attenuated, the degree of attenuation being an indication of bacterial growth.

BACKGROUND OF THE INVENTION

There has long existed a need for a fast, accurate and easy-to-operate method of detecting bacterial growth. In clinical research laboratories, and also in hospitals, where it is imperative that many cultures may be prepared, an inordinate amount of time is spent in preparing the dilutions, and then waiting relatively long periods of time before it can be accurately determined if there has been any growth. In the past, while carefully maintaining a sterile bacteria-free atmosphere, minute samples of the dilutions were taken and examined under a powerful microscope, or by use of diagnostic chemical solutions. While this method of examination was relatively effective, it nevertheless was time consuming and possessed the inherent failing of high inaccuracy, since it was based primarily on human judgment and eyesight. These factors alone made the system undesirable, and when aggravated by the problem of sheer numbers of tests to be performed, as in a laboratory, the situation becomes even more unsatisfactory.

SUMMARY

The present invention overcomes many of these weaknesses and shortcomings shown by prior art methods and equipment in that there is disclosed a bacterial growth detector which is accurate, easy to operate, and one which requires little time to function. A plurality of dilutions can be rapidly checked, almost simultaneously, and under conditions which require no unordinary surroundings.

An object of the present invention is the provision of a bacterial growth detector.

Another object of the invention is the provision of a bacterial growth detector that utilizes a plurality of light beams and a plurality of sensors.

Still another object of the invention is the provision of a bacterial detector which can simultaneously test samples in eight dilutions.

Yet another object of the invention is the provision of a bacterial detector which electronically determines results, and records these results on punch cards.

Still another object is the provision of a bacterial detector which employs bundles of optical fibers to conduct light to the sensors.

Another object is to overcome the disadvantages of the prior art.

Another object is to detect bacterial growth in an improved manner.

Another object is the provision of a bacterial growth detector which utilizes a sliding tray to carry the plurality of samples past the sensors.

Other objects and many of the attendant advantages of this invention will be readily appreciated as the same becomes better understood by reference to the following detailed description of an embodiment when considered in connection with the accompanying drawings in which like reference numerals designate like parts throughout the figures thereof.

BRIEF DESCRIPTION OF DRAWING

FIG. 2 is a plan view of the photo-transistor layout, with the light sources removed;

FIG. 3 is a side view of the photo-transistor layout;

DETAILED DESCRIPTION

Figure 1:
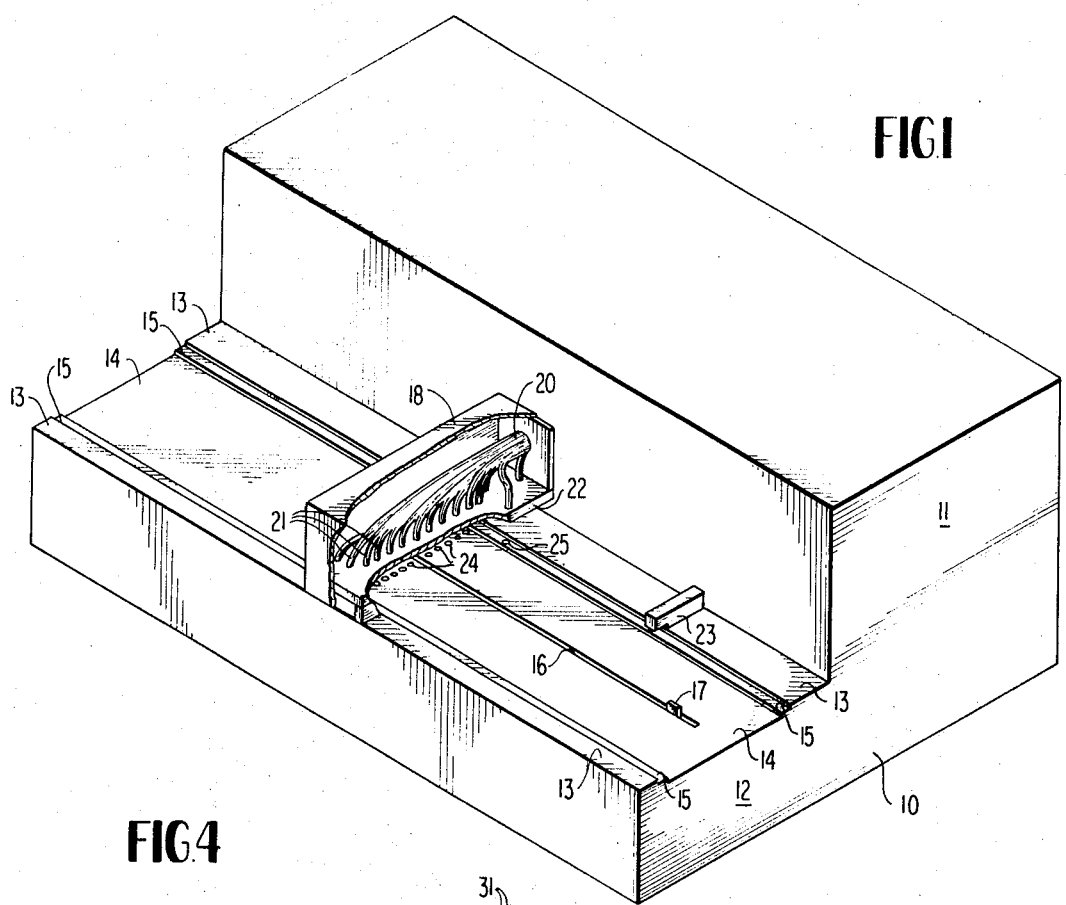
FIG. 1 is a perspective view of the growth detector assembly but with the sample tray removed.

Referring now to the drawings, and particularly to FIG. 1 which shows an over-all view of an embodiment, there is depicted a cabinet 10, or housing, which contains all of the working components of the detector. The disclosed cabinet 10 is generally of L-shaped configuration having a vertical portion 11 and a relatively horizontal portion 12. The vertical portion 11 contains the various illuminating lamps and power supplies while the electric motors, and tray advancing mechanism are preferably in the horizontal portion 12, all of these components not being shown in the figures.

The horizontal portion 12 of housing 10 has a level floor 13 extending along its entire length, and at the center section of this floor there is cut a channel 14, the bottom of which is also level but below that of floor 13. Along the two outer edges of the channel 14, and intermediate between floor 13 and the bottom of the channel, there are two shoulders 15 extending the length of the horizontal portion 12. The configuration of the channel 14 and its associated shoulders 15 are clearly visible in FIG. 1 and the vertical end view of FIG. 3.

Positioned in the center of channel 14, and extending along at least half of its length, there is a slot 16 with a pin 17 projecting up through it. By proper linkages (not shown) between pin 17 and the electric motors within vertical portion 12 of housing 10, the pin 17 may be made to advance along the slot 16, thereby carrying a tray of dilutions to phototransistors for sensing, as will be described more fully hereinafter.

Integrally attached to vertical portion 11 and positioned to extend parallel with horizontal portion 12 there is a smaller housing 18. As can be seen in FIG. 1 housing 18 rests on floor 13 and effectively bridges channel 14 and extends a short distance above it. Within housing 18 there is a bundle of optical fibers 20, the bundle being made of a plurality of individual strands 21, spaced apart to extend through the bottom 22 of the housing 18. Within housing 10, at the end of optic fiber bundle 20, there is located a light source (not shown) to conduct light along the bundle and ultimately through the individual strands 21. A short distance from small housing 18 there may be another closed chamber 23 forming still another component in the fiber-optic lighting system. Chamber 23 is fastened to floor 13 with only its outer end extending over the edge so as to overhang shoulder 15 and not the entire channel 14. Within chamber 23 there is a strand of optic fiber, lit by the same source as bundle 20, to conduct light to a special photo-transistor, as will be described later; chamber 23 and its fiber are optional.

Across the bottom of channel 14, positioned in a straight line so as to be in exact alignment with the individual fiber strands 21, there is a row of photo-transistors 24. The basic structure of the photo-transistor sensors is located beneath channel 14, inside horizontal portion 12, and only the light-sensitive ends are mounted flush with the level of the channel. One or more special sensors, depending on the type information it is desired to record, are located along shoulder 15, one such sensor being shown as at 25.

A detailed showing of the arrangement and number of the sensors is given in FIG. 2, with the small housing 18 and optic fiber bundle 20 removed for clarity. It may be noted in the view of FIG. 2 that another special sensor 26 may be located in floor 13, as well as other sensors 27, located on shoulder 15 opposite from that of sensor 25. At this point it may be appreciated that the number and location of the special sensors such as 25, 26, 27 and 28, or as many others as may be desired, can be used to indicate the beginning or end of a run, identification of the dilutions, light calibrators, or any other pertinent data.

Figure 4:
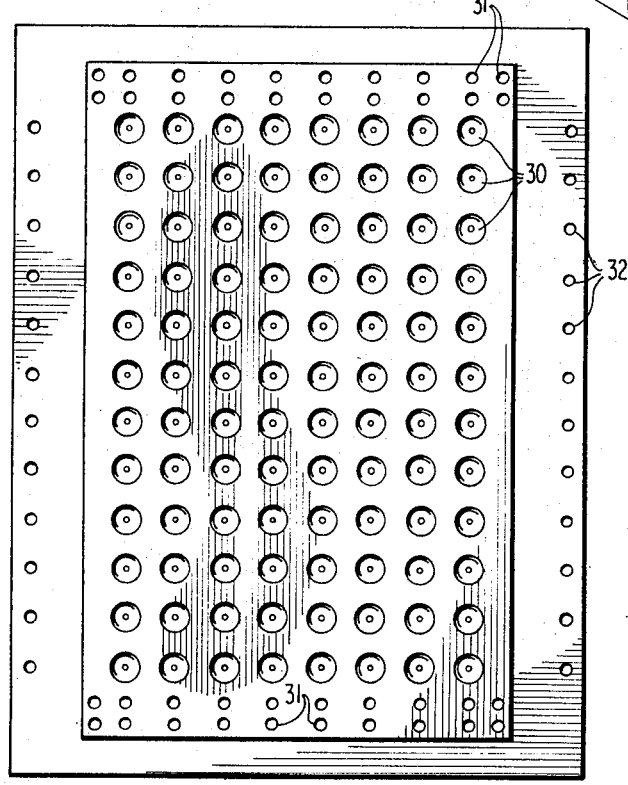
FIG. 4 is a plan view of the test tray.

Turning to FIG. 4 there is shown a view of the tray which is used to hold the dilutions being tested for bacterial growth. The tray has a plurality of test wells 30 arranged in rows and columns, there being 12 rows and 8 wells in a row, or 96 possible dilutions in the tray. Added markers 31 are at the ends of the tray while markers 32 are along the sides. By comparing the number of sensors shown in FIG. 2 with the number of wells and markers in FIG. 4 it can be seen that there are an exact number of sensors for the wells and markers.

Figure 5:
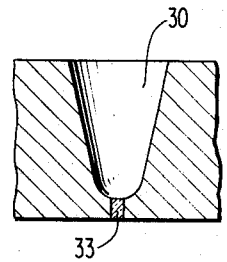
FIG. 5 is a cross-sectional view of at least one modification of test well (slightly enlarged) for holding the dilutions.

An enlarged, detailed view of a typical test well 30 is given in FIG. 5. The wells may be cone-shaped depressions, large at the top and small at the bottom or they may be cylindrical; a tiny transparent window 33 is provided in the structure forming the well at the bottom. It is obvious the transparent window 33 permits light to shine through the well and thus through the dilution in the well under test.

Various uses may be made of the present device, e.g., it may be used in an antibiotic sensitivity test. Samples of the patient's selected body fluid, such as urine, blood serum, etc., containing possible pathogens, are combined with varying concentrations of a selected antibiotic, or of different antibiotics, and the resultant solutions are placed in wells 30. In this manner the effectiveness of a given concentration of a given antibiotic on the pathogen can be readily determined.

Experimental bacterial growths can also be detected, and the dilutions are set up in the test tray as follows: First, all of the test wells 30 are filled with a nutrient which can serve as food for the bacteria under test. Next, an accurately measured amount of bacteria is inserted in the first well with the nutrient, giving thereby a known dilution. Then, a very carefully measured amount of dilution is taken from the first well and inserted in the second well, followed by a like amount being taken from the second and put into the third, and so on for the whole set of 96 wells. By this method it is obvious that there is provided a plurality of dilutions, each with an accurately calibrated percentage of dilution from the others, and in diminishing order. Then when bacterial growth is detected if this growth is according to anticipated results, the detected growth will follow a gradually falling curve.

Hemagglutination tests or hemag-inhibition tests may be conducted using blood cells or chicken embryo cells, and in these situations the test wells are filled as before to get the percentage dilutions, and results are detected by the amount of residue in the bottom of the wells. In any case when the test wells are loaded with their dilutions there is provided a chain of serial dilutions for test by the detector.

Figure 6:
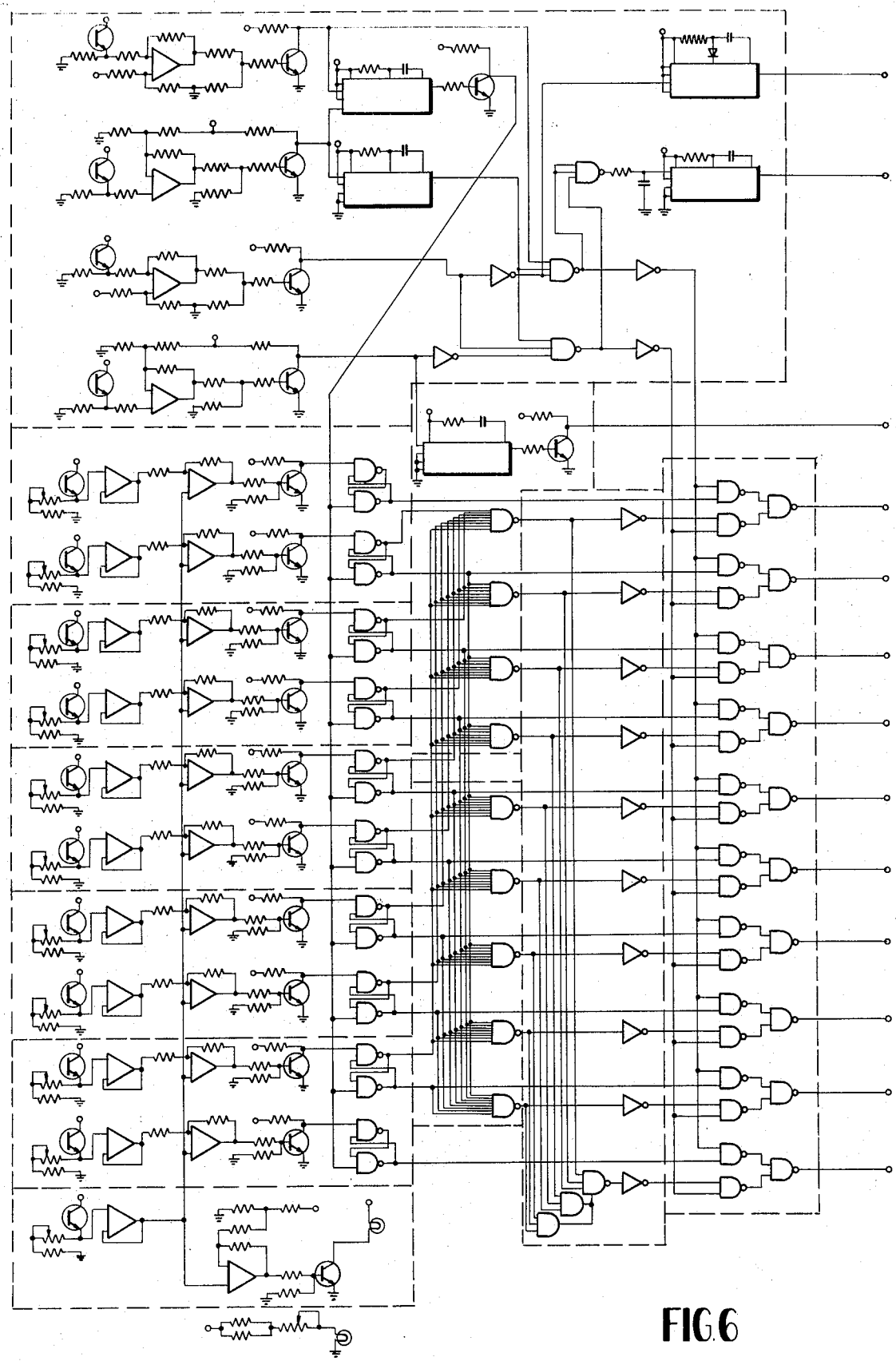
FIG. 6 is a schematic of the electronic sensing circuit.

FIG. 6 shows a schematic of the electronic circuitry making up the sensing element of the detector. Light shining through the various dilutions in the test wells energize the photo-transistors to cause current flow in the circuitry associated with each transistor. Before a test tray is run through the detector the device is calibrated by having light from the optical fiber bundles shine through a calibrating filter onto the transistors. Then when an actual test is being performed, and light is passed through the dilutions, if there is bacterial growth present, then the opaqueness of the fluid is altered. This causes less light to impinge on the transistors with a corresponding reduction in current flow, the detector measuring this attenuation in light as an indication of bacterial growth. An added feature of the circuitry is the provision of a logic component. When a test tray of dilutions is run through the detector, and the dilutions have been prepared as a chain of serial dilutions of antibiotics with very carefully measured proportions of bacteria, as described above, then the sensed bacterial growth should follow a predetermined pattern of decreasing amounts. Should there suddenly, for some reason, be an out of line reading the logic component realizes that fact and causes an appropriate indication to be noted on an IBM card.

The sensing circuits of FIG. 6 also function with the special transistors 25, 26, 27 and 28 positioned along the edges and ends of the test tray. These special sensors have the special function of switching the row of photo-transistor sensor 24 from coding or identification, to testing.

In operation a test tray of dilutions is placed on shoulders 15 of the horizontal portion 12, and the detector power turned on. Pin 17 contacts the bottom of the tray, and as the pin moves along slot 16 the tray is pulled along shoulders 15. Markers 31 and 32 at the ends and sides of the tray are sensed by various photo-transistors 25, 26, 27 and 28 until finally the rows of test wells 30 pass beneath fiber optic strands 21 where light from the strands 21 pass through the wells and their dilutions and onto sensors 24 below the tray. Any change in light is recorded electronically by equipment located within housing 10.

The device accepts standard disposable microtitration plates containing up to 12 antibiotic sensitivity tests of 8 dilutions each. Light is passed through each test well and the amount transmitted is detected by a photo-transistor. If bacterial growth is present in the test well, the light is attenuated and the voltage in the photo-transistor circuit drops. This drop is detected electronically and that particular test is stored as a positive test. After all 8 dilutions have been checked, the end-point of the dilution is determined electronically and punched on a standard IBM card. If a non-legitimate pattern appears, i.e. a non-consecutive pattern of positive tests, an error is recorded. Thus, if the first five tests are positives and the last three are negatives, the end point punched is five, i.e., the fifth test was the last positive in the serial dilution. The device can also record a 2 digit number from the plate for identification. Each plate of 96 tests (12 tests of 8 dilutions each) can be read in approximately 10 seconds.

The device is entirely solid state electronics. The light level detection circuit is based on the difference between the test circuit and a reference circuit so that common changes due to temperature, bulb aging, etc. are canceled.

From the above description of the structure and operation of the invention it is obvious that the device offers many improvements over prior art bacterial growth detectors in that it is very accurate since it eliminates human error, is extremely fast in testing almost 100 dilutions in approximately 10 seconds, and is capable of automatically recording the test results.

Obviously many modifications and variations of the present invention are possible in the light of the above teachings. It is therefore to be understood, that within the scope of the appended claims, the invention may be practiced otherwise than as specifically described.

What is claimed is:

1. A bacterial growth detector comprising
bacterial growth carrier means including a plurality of test wells for holding and transporting a bacterial growth solution, the concentration of which is different in each well from every other well, the varying concentration providing a serial titration of said bacterial growth;
sensing means for identifying the dilutions in the wells and for measuring the densities thereof as said carrier means moves the serial titration well past said sensing means; and
data processing means electrically connected to said means for sensing density to automatically compare the measured densities with predetermined values and to automatically calculate and indicate the end point of the serial titration.

2. The device of claim 1 wherein said carrier means comprises
a tray; said tray having an upper and lower surface, with said bacterial growth holding wells located on said upper surface for receiving the serial titration, first light conducting means disposed between said holding wells and said lower surface of said tray for transmitting light through said tray, and second light conducting means disposed between said upper and lower surfaces of said tray for transmitting light through said tray and
conveyor means for moving said tray past said density sensing means.

3. The device of claim 2 wherein said first light conducting means includes a solid transparent element; and
said conveyor means includes a pin movable a predetermined distance over a predetermined path and engageable with said tray.

4. The device of claim 2 wherein said density sensing means comprises
a source of light;
a third light conducting means for transmitting light from said source to said bacterial growth holding wells and said first light conducting means, and to said second light conducting means; and
light sensing means for receiving and detecting the light transmitted through said first and said second light conducting means.

5. The device of claim 4 wherein
said third light conducting means includes a plurality of fiber optic elements; and
said light sensing means includes electronic means connected thereto for measuring any attenuation in the light supplied by said third light conducting means as the light passes through said serial titration.

6. The device of claim 5 wherein said electronic means include photo-transistors.

7. The device of claim 1 wherein said data processing means comprises
a logic circuit, said logic circuit producing an indication should the attenuation of the light not follow a predetermined pattern.

8. The device of claim 1 further comprising data storage means, connected to said data processing means, for permanently recording the end point of the serial titration, said storage means including a computer punch card.

* * * * *